(12) United States Patent
Luerkens

(10) Patent No.: US 9,425,703 B2
(45) Date of Patent: Aug. 23, 2016

(54) AC/DC CONVERTER CIRCUIT FOR COMMON THREE-PHASE AC INPUT VOLTAGES AND METHOD OF OPERATING SUCH CONVERTER CIRCUIT

(75) Inventor: Peter Luerkens, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/516,059

(22) PCT Filed: Jan. 4, 2011

(86) PCT No.: PCT/IB2011/050016
§ 371 (c)(1),
(2), (4) Date: Jun. 14, 2012

(87) PCT Pub. No.: WO2011/083418
PCT Pub. Date: Jul. 14, 2011

(65) Prior Publication Data
US 2012/0262966 A1    Oct. 18, 2012

(30) Foreign Application Priority Data

Jan. 11, 2010 (EP) .................................... 10150456

(51) Int. Cl.
H02M 7/217 (2006.01)
H02M 7/04 (2006.01)
H02M 7/06 (2006.01)
H02M 1/00 (2006.01)

(52) U.S. Cl.
CPC .............. *H02M 7/2173* (2013.01); *H02M 7/04* (2013.01); *H02M 7/066* (2013.01); *H02M 7/217* (2013.01); *H02M 2001/007* (2013.01)

(58) Field of Classification Search
CPC ..................................................... H02M 7/217
USPC ........... 363/127, 44, 45, 87, 129, 65, 126, 20, 363/21.02, 89, 41, 42, 43
See application file for complete search history.

(56) References Cited

U.S. PATENT DOCUMENTS

| 3,927,362 A | * | 12/1975 | Brewster ........................... 363/3 |
| 4,317,039 A | * | 2/1982 | Romandi ....................... 378/105 |
| 6,466,466 B1 | * | 10/2002 | Karlsson et al. ................. 363/44 |

(Continued)

FOREIGN PATENT DOCUMENTS

| JP | S4959950 A | 6/1974 |
| JP | S5364724 A | 6/1987 |

(Continued)

*Primary Examiner* — Jeffrey Gblende
*Assistant Examiner* — Trinh Dang

(57) ABSTRACT

The invention relates to an AC/DC converter circuit (100) and a method for converting N≥2 AC supply voltages (U1, U2, U3) into DC voltage. This is achieved by feeding the AC supply voltages to first terminals (a1, a2, a3) of full bridge converters (11, 12, 13), wherein the second terminals (b1, b2, b3) of these rectifiers are coupled to each other. The outputs (d11, d1', d2, d2', d3, d3') of the rectifiers are fed to the DC terminals of intermediate converters (21, 22, 23). The AC terminals (e1, e1', e2, e2', e3, e3') of the intermediate converters are connected to the primary sides of transformers (31, 32, 33), wherein the secondary sides of these transformers are provided to further rectifiers (41, 42, 43). The circuit design allows using MosFETs of limited voltage capability for processing 380 V three-phase AC current, thus achieving a high efficiency.

24 Claims, 2 Drawing Sheets

(56) References Cited

U.S. PATENT DOCUMENTS

| | | | |
|---|---|---|---|
| 7,046,532 B2* | 5/2006 | Matsuo et al. | 363/65 |
| 7,499,297 B2* | 3/2009 | Stulz et al. | 363/37 |
| 8,030,884 B2* | 10/2011 | King et al. | 320/104 |
| 2006/0083035 A1 | 4/2006 | Lubomirsky | |
| 2006/0165220 A1* | 7/2006 | Takahashi et al. | 378/109 |
| 2007/0086224 A1* | 4/2007 | Phadke et al. | 363/65 |
| 2007/0120598 A1 | 5/2007 | Lubomirsky | |
| 2007/0153555 A1* | 7/2007 | Stulz et al. | 363/20 |
| 2008/0298093 A1 | 12/2008 | Jin et al. | |
| 2008/0304296 A1* | 12/2008 | NadimpalliRaju et al. | 363/45 |
| 2008/0304300 A1 | 12/2008 | Raju et al. | |
| 2009/0154200 A1* | 6/2009 | Coccia et al. | 363/21.02 |
| 2009/0268496 A1* | 10/2009 | Tan et al. | 363/126 |
| 2010/0091533 A1* | 4/2010 | Masson et al. | 363/127 |
| 2012/0044727 A1* | 2/2012 | Bartsch | 363/74 |

FOREIGN PATENT DOCUMENTS

| | | |
|---|---|---|
| JP | H05161359 A | 6/1993 |
| JP | H0727294 U | 5/1995 |
| JP | H08251920 A | 9/1996 |
| JP | H10225122 A | 8/1998 |
| WO | 2009054348 A1 | 4/2009 |

* cited by examiner

AC/DC CONVERTER CIRCUIT FOR COMMON THREE-PHASE AC INPUT VOLTAGES AND METHOD OF OPERATING SUCH CONVERTER CIRCUIT

FIELD OF THE INVENTION

The invention relates to an AC/DC converter circuit comprising a plurality of full bridge rectifiers that can be connected to separate AC supply voltages.

BACKGROUND OF THE INVENTION

From the US 2006/0083035 A1, an AC/DC converter circuit is known that comprises three bridge rectifiers composed of diodes, wherein first terminals of the rectifiers are connected to different phases of a three-phase AC input voltage while the corresponding second terminals of the rectifiers are coupled to each other. The outputs of the three rectifier circuits are used as three separate sources of DC voltage.

SUMMARY OF THE INVENTION

Based on this background it was an object of the present invention to provide alternative means for converting different AC voltages into DC voltage, wherein it is desirable that the solution operates with high efficiency for common three phase AC input voltages. Furthermore, it is desirable to provide means for achieving mains current with low harmonic distortion and unity power factor and/or to provide means for energy flow both from the AC mains into the DC voltage, and also from the DC voltage into the AC mains.

This object is achieved by an AC/DC converter circuit according to claim 1 and a method according to claim 2. Preferred embodiments are disclosed in the dependent claims.

The AC/DC converter circuit according to a first aspect of the invention serves for converting a number of N≥2 AC supply voltages into DC voltage. It comprises the following components:

A number of N full bridge converters, each of these converters having a first terminal for connection to a separate one of the AC supply voltages and a corresponding second terminal, wherein said second terminals of all converters are coupled to each other. For the purpose of reference, the full bridge converters will be called "external converters" in the following, indicating that they process the externally supplied AC voltages. As known to a person skilled in the art, a "full bridge converter" comprises four electrical valve elements (e.g. transistors) that are connected in two parallel branches comprising two valve elements each between a first and a second corresponding (AC input-) terminal, wherein a DC voltage appears between the intermediate points of the branches (if the valves are properly oriented and controlled).

A number of N "intermediate converters", each of these N intermediate converters receiving at its primary side the (DC) output of one of the aforementioned external converters.

A number of N transformers, each of the N transformers receiving at its primary side the (AC) output of one of the aforementioned intermediate converters.

A number of N rectifiers, wherein each of these rectifiers is connected to the secondary side of one of the aforementioned transformers. For the purpose of reference, these rectifiers will be called "internal rectifiers" in the following, indicating that they process an internal AC voltage of the AC/DC converter circuit. In particular, the internal rectifiers receive the AC voltage that is generated at the secondary side of the transformers by the time-variable voltages applied to the primary sides of the transformers.

According to a second aspect, the invention relates to a method for converting a number of N≥2 AC supply voltages into DC voltage, said method comprising the following steps:

Feeding the AC voltages to separate first terminals of N full bridge "external" converters whose corresponding second terminals are coupled to each other.

Feeding the outputs of said external converters to the DC terminals of N separate "intermediate" converters.

Feeding the AC terminals of said intermediate converters to the primary sides of N separate transformers.

Rectifying the outputs of the aforementioned transformers.

The described method may particularly be executed with the help of an AC/DC converter circuit of the kind described above. Both this AC/DC converter circuit and the method have the advantage that they limit the maximal voltages which have to be dealt with by processing different AC supply voltages in parallel with separate external converters, intermediate converters, transformers, and internal rectifiers. Moreover, they allow adjusting the resulting DC voltage to a desired level by selecting the transformers appropriately.

In the following, various preferred embodiments of the invention will be described that relate to both the AC/DC converter circuit and the method described above.

In a first preferred embodiment, the AC supply voltages that are processed may be phase shifted sinusoidal voltages, in particular sinusoidal voltages of the same frequency.

The number N of processed AC voltages (corresponding to the number N of external converters, intermediate converters, transformers, and internal rectifiers) may particularly have a value of three. In combination with the aforementioned embodiment, this covers the practically important case that the processed AC voltages are conventional three-phase AC grid voltages, i.e. that they consist of three sinusoidal voltages which are phase-shifted by 120° with respect to each other.

In general, the electrical valve elements in the external/intermediate converters and/or the internal rectifier may be any component that is suited to deal with the requirements posed by the AC and/or DC voltage to be processed. In a preferred embodiment, the external converters, the intermediate converters, and/or the internal rectifiers are composed of MosFETs as electrical valve elements. A MosFET has the advantage to operate with little electrical losses in comparison to other electronic components that could be used for the same purpose. It is a particular advantage of the present invention that the use of MosFETs becomes possible in many applications because the voltages occurring inside the circuit are limited to below 400 V in the standard situation that three-phase 380 V AC voltages are processed. In addition, by using MosFETs also for the internal rectifier, bi-directional power flow becomes possible.

The second terminals of the external converters are preferably coupled to each other via chokes to suppress high frequency signals in these lines.

The output terminals of each external converter are preferably connected to each other via a capacitor in order to smooth the DC voltage appearing at them.

Moreover, the output terminals of each external converter are coupled to the DC terminals of an intermediate converter, e.g. a half-bridge converter. The AC terminals of the intermediate converter may be coupled to the corresponding transformer by a resonant network, consisting of a capacitor and possibly an inductor. The function of the inductor may be implemented likewise by the leakage inductance of the transformer, so that a discrete inductor is not always needed to establish a resonant circuit.

The transformers may be realized as distinct components. In a preferred embodiment, the transformers are however arranged on a common 3-leg core. In this way both a compact design and an electrical coupling can be achieved.

The (AC) voltage appearing at the secondary side of the transformers can be processed in different ways. In a preferred embodiment, the secondary side of each transformer comprises a first terminal and a second terminal, wherein the second terminals of all transformers are coupled to each other. The voltages at the first terminals of the transformers are then all related to a common reference point.

In a further development of the aforementioned embodiment, the internal rectifiers are half bridge rectifiers, each of them being connected to one of said first terminals on the secondary sides of the transformers. The two output terminals of these half bridge rectifiers, at which the high and the low potential of a DC output voltage appears, may for instance be used separately (e.g. to operate different loads). Most preferably, the positive output lines of all internal rectifiers are coupled to each other and all negative output lines are coupled to each other in a parallel arrangement.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components.

DESCRIPTION OF PREFERRED EMBODIMENTS

Figure 1:
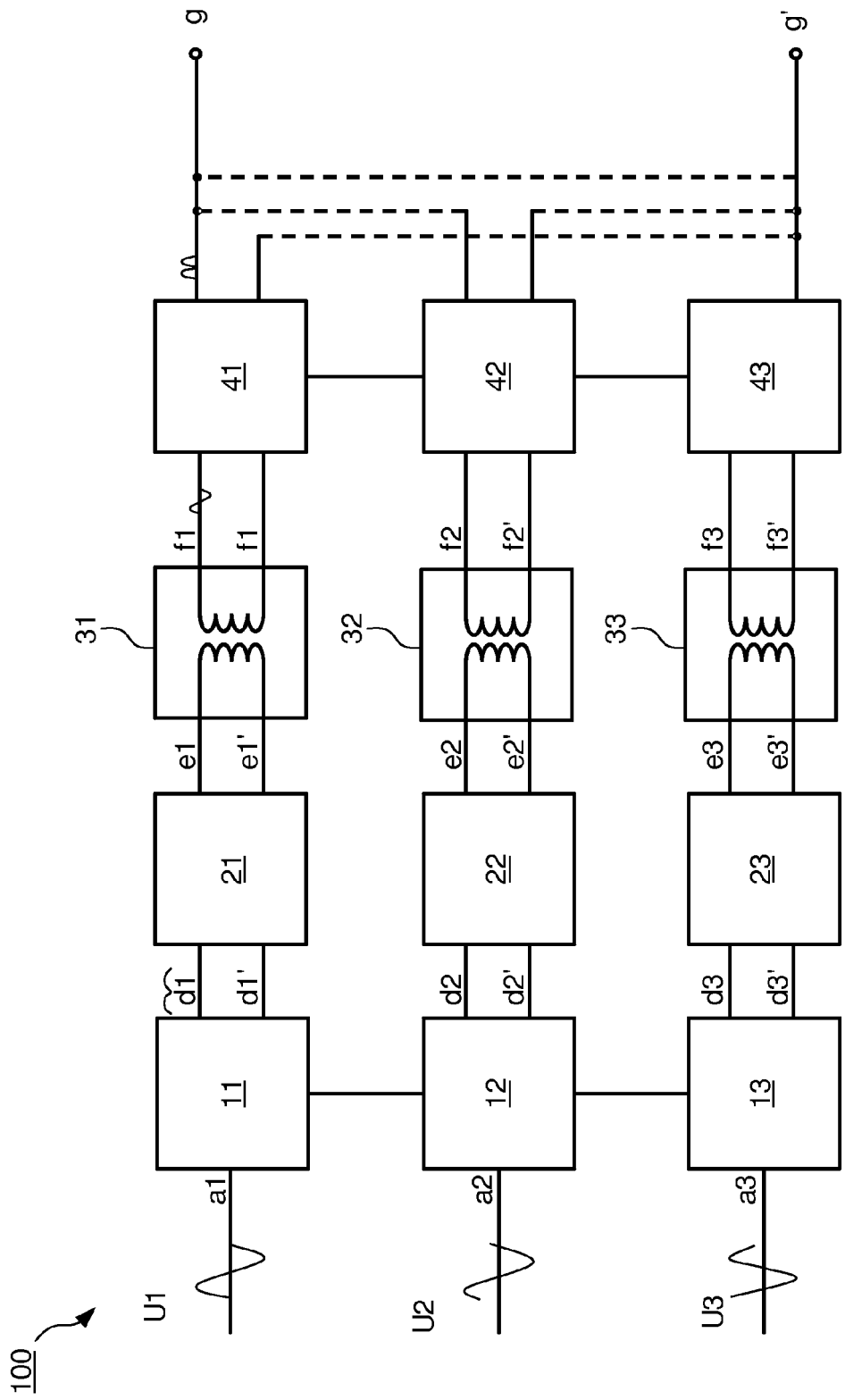
FIG. 1 schematically illustrates an AC/DC converter circuit according to the present invention.

At time, various methods to increase energy efficiency of buildings are investigated. One possible solution is substituting the building power distribution backbone, which is presently based on low frequency AC voltage, by a DC backbone. The argument is, that nowadays a dominant fraction of applications, including lighting, are so-called electronic loads, which means, they contain some electronic circuits, effectively being supplied by a DC voltage.

Presently the conversion of the AC voltage of the grid into a DC voltage has to be done locally in each device, at a minimum cost price, effectively limiting the possible energy efficiency of the device. It is therefore proposed to centralize this function, and thus concentrating effort in a much more efficient solution, while saving the AC/DC conversion cost in numerous small devices. If local power generation is considered in parallel, today the energy flow typically starts from a DC source (e.g. a photovoltaic panel), is converted to AC with a certain amount of losses, and then again converted to DC, again with losses, until it is supplied into some useful function. In this case two times the AC/DC conversion losses occur, which are short-cut in a DC distribution grid.

Nevertheless, a connection between the DC grid in the building and the public AC grid will remain, in order to get energy from the grid, for situations, when local generation is not or not sufficiently available, or to feed surplus local capacity back into the grid. Of course it is crucial that the average efficiency of the central AC/DC converter is at least as high as the efficiency of the previously dispersed AC/DC converter functions. Moreover, this has to be achieved for a much higher power budget (e.g. 100 kW) and at a 3-phase mains connection. It is also required that the system maintains a close-to-unity power factor.

Other critical parameters of a DC distribution system are the level of the DC voltage, and the voltage of its conductors versus ground. In order to fulfil the intention to simplify power distribution it is of advantage to have a DC system that comes close to the preferred DC voltage levels in the applications, minimizing adaption effort of existing applications. Nowadays this is around 400 V, as a consequence of the rectification of the single phase 230 V AC mains voltage and an additional power factor correction stage. The actual DC voltage should not be too high, too, as this would introduce problems with installation safety, as switches and circuit breakers have increasing problems with higher DC voltages.

It is also of advantage to have a voltage that does not have strong ripple versus the protective earth, as this introduces problems with hum, insulation, and protective systems.

When the above issues are addressed, a first problem is that a conventional AC/DC converter, e.g. a three-phase controlled rectifier, requires a DC bus voltage in the range of 650 V for reliable operation, which is higher than desired. This excludes the use of MosFETs, in the converter, as these cannot efficiently handle these voltage levels at all. The only choice is using IGBT devices. The problem of IGBTs is however that these devices have a minimum voltage drop in the order of 2.5-3 V, which puts a limit on the maximum achievable efficiency. A third problem is that DC voltage produced by such a system is normally not independent from the protective ground, as the public grid is frequently already referenced to it.

To solve the above problems, the invention proposes combination of a 3-phase AC/DC converter with a 3-phase resonant DC/DC converter with a high frequency transformer. By this the maximum voltage for all semiconductor devices can be limited to 400 V at most, which makes use of efficient MosFETs possible. Moreover, the special topology of the AC/DC converter part reduces the design requirements of the essential magnetic components strongly (by a factor of two) and thus contributes to lower cost and higher efficiency. The produced DC voltage can be arbitrarily chosen, because of the high frequency transformer, and it is isolated from protective earth, which offers a free choice for the reference potential.

FIG. 1 illustrates the general setup of an AC/DC converter circuit 100 according to the invention, which comprises the following components:

A number of N=3 full bridge "external" converters 11, 12, and 13. A first terminal a1, a2, a3 of each converter is connected to a separate one of the AC supply voltages U1, U2, U3.

Three associated "intermediate converters" 21, 22, and 23 and transformers 31, 32, and 33, wherein the terminals e1, e1', e2, e2', and e3, e3' on the primary sides of the transformers are connected to the AC terminals of the intermediate converters. The DC terminals of the converters d1, d1', d2, d2', and d3, d3' are connected to the (DC) outputs of the aforementioned external converters.

Three associated "internal" rectifiers 41, 42, and 43, wherein each of these rectifiers is connected to the terminals f1, f1', f2, f2', and f3, f3' at the secondary side of the aforementioned transformers. The outputs of the internal rectifiers are connected in parallel to overall DC output terminals g, g'.

Figure 2:
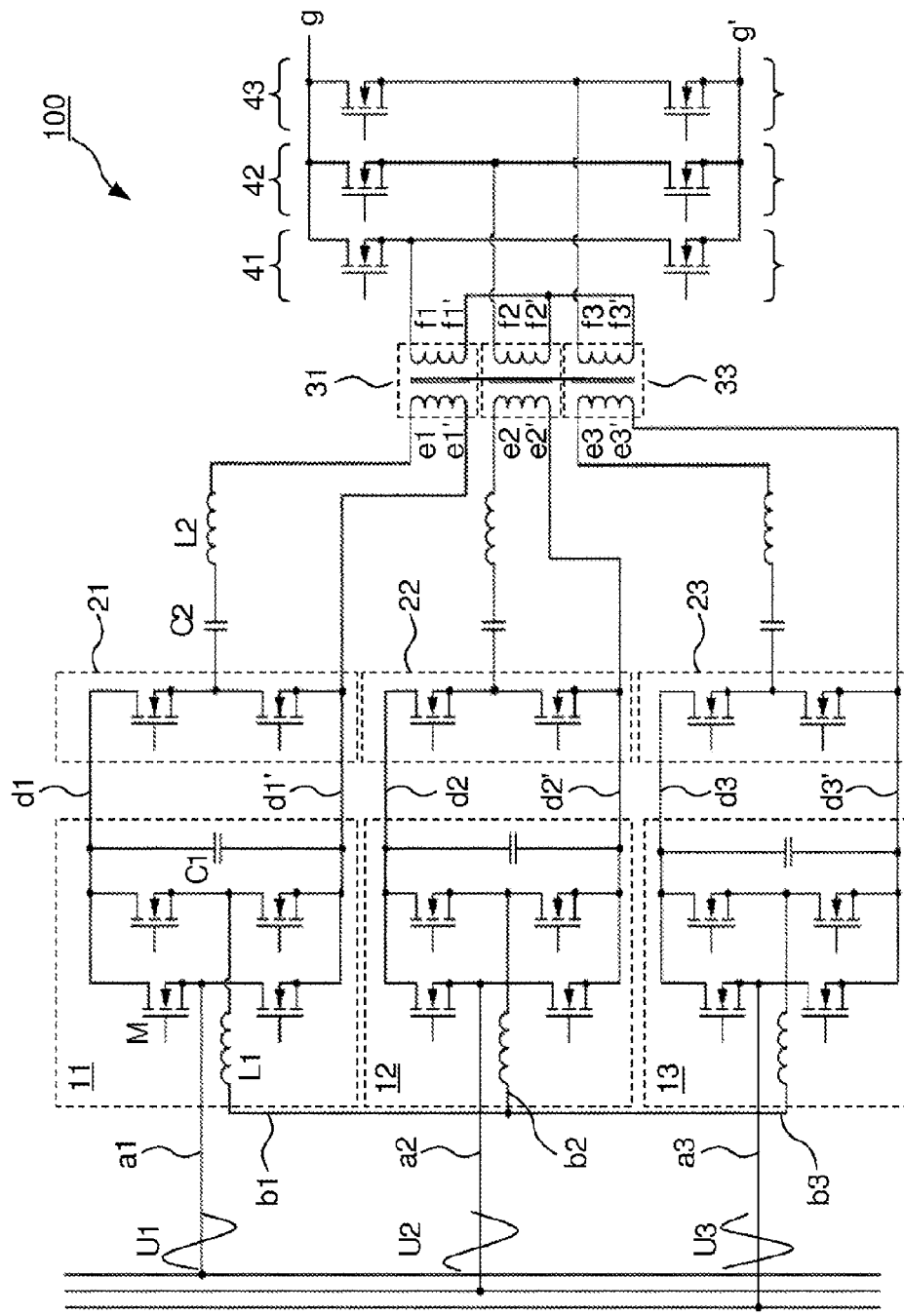
FIG. 2 illustrates one particular layout of such a converter circuit.

FIG. 2 shows a particular layout of the AC/DC converter circuit 100 in more detail. The converter circuit 100 comprises the three full bridge "external" converters 11, 12, and 13, where each converter module is connected with a first terminal a1, a2, a3 directly, or by means of an EMI filter (not shown) to the grid (phases U1, U2, U3), while the corresponding second terminal b1, b2, b3 is connected to a first terminal of three chokes L1, and the second terminal of each choke is connected with the second terminal of the other chokes. This way, each of the full bridge converters 11-13 produces a floating DC voltage at no more than 400 V at the output lines d1, d1', d2, d2', and d3, d3', respectively.

The aforementioned three DC voltages are supplied by another half-bridge (or full-bridge) converter module 21, 22, and 23 to a three phase transformer 31, 32, 33 (or three single phase transformers), in the form of a resonant DC/DC converter. The primary sides of these transformers have input terminals e1, e1', e2, e2', and e3, e3'.

The secondary sides of the transformers with the terminals f1, f1', f2, f2', and f3, f3' are connected to rectifiers 41, 42, and 43, which can again be in form of a three-phase converter or full-bridge modules and thus allowing bi-directional energy flow.

Because of the transformer(s), any desired DC output voltage can be accomplished by selecting an appropriate turn ratio, and the voltage can be referenced to ground in any desired way. Because MosFETs M are used throughout the system, semiconductor losses can be virtually eliminated by paralleling a sufficient number of devices. Calculations show that a maximum efficiency of 98.5%-99% can be achieved, while conventional systems are limited to 97%, which effectively means a reduction of losses by two thirds.

The described converter circuit 100 can inter alia be used as a central grid coupling module in DC grids in buildings. In a smaller variant it may be also of interest for converters for horticultural lighting, or charging systems for electric vehicles or plug-in hybrids.

In summary, the invention relates to an AC/DC converter circuit 100 and a method for converting $N \geq 2$ AC supply voltages U1, U2, U3 into DC voltage. This is achieved by feeding the AC supply voltages to first terminals of full bridge converters, wherein the second terminals of these converters are coupled to each other. The outputs of the converters are fed to intermediate converters. The output of the intermediate converters is fed into the primary sides of transformers, wherein the secondary sides of these transformers are provided to further rectifiers. The circuit design allows using MosFETs of limited voltage capability, e.g. 500V, for processing 380 V three phase AC current, thus achieving a high efficiency.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An AC/DC converter circuit for converting N>2 AC supply voltages into a DC voltage, the circuit comprising:
    N full bridge external converters, each of the N full bridge external converters comprising a first terminal configured to be connected to a separate one of the N>2 AC supply voltages and a second terminal, wherein the second terminals are coupled to each other;
    N intermediate converters, each of the N intermediate converters configured to receive an output of a different respective one of the N full bridge external converters at DC terminals of the intermediate converter;
    N transformers, each of the N transformers configured to receive an output of a different respective one of the N intermediate converters at a primary side of the transformer;
    N resonant circuits, each of the N resonant circuits disposed between a different respective one the N intermediate converters and a different respective one of the N transformers; and
    N internal rectifiers, each configured to be connected to a secondary side of a different respective one of said N transformers, wherein:
    each of the N internal rectifiers comprises first and second MOSFETs having source and drain terminals, the drain terminals of the N first MOSFETs are directly, electrically connected to a first node, the source terminals of the N second MOSFETs are directly, electrically connected to a second node, and a voltage potential developed between the first and second nodes constitutes the DC voltage, and
    for each of the N internal rectifiers, the source of the first MOSFET is directly, electrically connected to the drain of the second MOSFET and to the secondary side of a different respective one of said N transformers.

2. The converter circuit according to claim 1, wherein the N>2 AC supply voltages are phase shifted sinusoidal voltages.

3. The converter circuit according to claim 1, wherein N is three.

4. The converter circuit according to claim 1, wherein at least one of the N full bridge external converters or N intermediate converters comprises a MOSFET.

5. The converter circuit according to claim 1, wherein the second terminals of the N full bridge external converters are coupled to each other via chokes.

6. The converter circuit according to claim 1, wherein output terminals of at least one of the N full bridge external converters are connected via a capacitor.

7. The converter circuit according to claim 1, wherein at least one of the N intermediate converters is a half-bridge converter.

8. The converter circuit according to claim 1, wherein output terminals of at least one of the N full bridge external converters are coupled to the respective one of the N transformers via a resonant network, the resonant network comprising a capacitor and/or an inductor.

9. The converter circuit according to claim 1, wherein the N transformers are realized on a common core.

10. The converter circuit according to claim 1, wherein the secondary side of each of the N transformers comprises a first terminal and a second terminal, wherein all second terminals of the N transformers are coupled to each other.

11. The converter circuit of claim 1, wherein the N transformers are isolated from a protective earth potential.

12. The converter circuit of claim 1, wherein the N transformers have a reference potential with respect to a protective earth potential.

13. The converter circuit of claim 1, wherein the converter circuit substantially maintains a unity power factor.

14. The converter circuit of claim 1, wherein each of the N full bridge external converters produces a floating DC voltage of about 380 Volts to about 400 Volts.

15. The converter circuit of claim 1, wherein the converter circuit has a conversion efficiency exceeding about 97%.

16. The converter circuit of claim 15, wherein the converter circuit has a conversion efficiency of about 98.5% to about 99%.

17. A method for converting N>2 AC supply voltages into a DC voltage, the method comprising:
- feeding each of the N>2 AC supply voltages to a first terminal of a different respective one of N full bridge external converters comprising second terminals coupled to one another;
- feeding an output of each of the N full bridge external converters to DC terminals of a different respective one of N intermediate converters;
- feeding an output of each of the N intermediate converters through a different respective one of N resonant circuits into a primary sides of a different respective one of N transformers; and
- rectifying the output of each of the N transformers with a respective one of N internal rectifiers, wherein:
- each of the N internal rectifiers comprises first and second MOSFETs having source and drain terminals, the drain terminals of the N first MOSFETs are directly, electrically connected to a first node, the source terminals of the N second MOSFETs are directly, electrically connected to a second node, and a voltage potential developed between the first and second nodes constitutes the DC voltage, and
- for each of the N internal rectifiers, the source of the first MOSFET is directly, electrically connected to the drain of the second MOSFET and to the secondary side of a different respective one of said N transformers.

18. The method according to claim 17, wherein at least one of the N full bridge external converters or N intermediate converters comprises a MOSFET.

19. The method according to claim 17, further comprising coupling the second terminals of the N full bridge external converters to each other via chokes.

20. The method according to claim 17, further comprising connecting output terminals of at least one of the N full bridge external converters via a capacitor.

21. The method according to claim 17, wherein the N intermediate converters are half-bridge converters.

22. The method according to claim 17, further comprising coupling output terminals of at least one of the N full bridge external converters to the respective one of the N transformers via a resonant network, the resonant network comprising a capacitor and/or an inductor.

23. The method according to claim 17, wherein the N transformers are realized on a common core.

24. The method according to claim 17, wherein a secondary side of each of the N transformers comprises a first terminal and a second terminal, the method further comprises coupling the second terminals of the N transformers to each other.

* * * * *